(12) United States Patent
Andrews

(10) Patent No.: US 8,968,619 B2
(45) Date of Patent: Mar. 3, 2015

(54) METHOD AND MANUFACTURING A WHEEL AND TYRE COMBINATION

(75) Inventor: Michael J. Andrews, Cheshire (GB)

(73) Assignee: Capak Ltd., Bunbury, Tarporley, Cheshire (GB)

( * ) Notice: Subject to any disclaimer, the term of this patent is extended or adjusted under 35 U.S.C. 154(b) by 526 days.

(21) Appl. No.: 13/375,558

(22) PCT Filed: Jun. 4, 2010

(86) PCT No.: PCT/GB2010/050943
§ 371 (c)(1),
(2), (4) Date: Dec. 20, 2011

(87) PCT Pub. No.: WO2010/140004
PCT Pub. Date: Dec. 9, 2010

(65) Prior Publication Data
US 2012/0126609 A1    May 24, 2012

(30) Foreign Application Priority Data

Jun. 6, 2009  (GB) .................................. 0909779.1

(51) Int. Cl.
*B29C 45/14*         (2006.01)
(52) U.S. Cl.
USPC ... 264/273; 264/275; 264/328.12; 264/328.9; 264/267

(58) Field of Classification Search
None
See application file for complete search history.

(56) References Cited

U.S. PATENT DOCUMENTS

| | | | |
|---|---|---|---|
| 4,124,051 A | 11/1978 | Horton | |
| 4,164,251 A | 8/1979 | Chung | |
| 4,350,196 A | 9/1982 | Hampshire | |
| 4,379,104 A | 4/1983 | Koorevaar | |
| 4,387,070 A | 6/1983 | Cunard et al. | |
| 4,588,542 A | 5/1986 | Pierce | |
| 4,765,382 A | 8/1988 | Sahagian | |
| 6,447,702 B1 | 9/2002 | Ichihara | |
| 2004/0261925 A1 | 12/2004 | Chen | |

FOREIGN PATENT DOCUMENTS

| | | |
|---|---|---|
| EP | 0602738 A1 | 6/1994 |
| GB | 2119724 A | 11/1983 |
| JP | 8040008 A | 2/1996 |

*Primary Examiner* — Edmund H. Lee
(74) *Attorney, Agent, or Firm* — Barlow, Josephs & Holmes, Ltd.

(57) ABSTRACT

A method of manufacturing a wheel and a tire comprising the steps of providing a wheel and molding a tire to the wheel. A mold may be placed over the wheel, such that a cavity is formed between an inner surface of the mold and a rim of the wheel, for receiving material to form the tire, which may be in a liquid form and allowed to solidify in the mold to form a tire attached to the wheel.

12 Claims, 5 Drawing Sheets

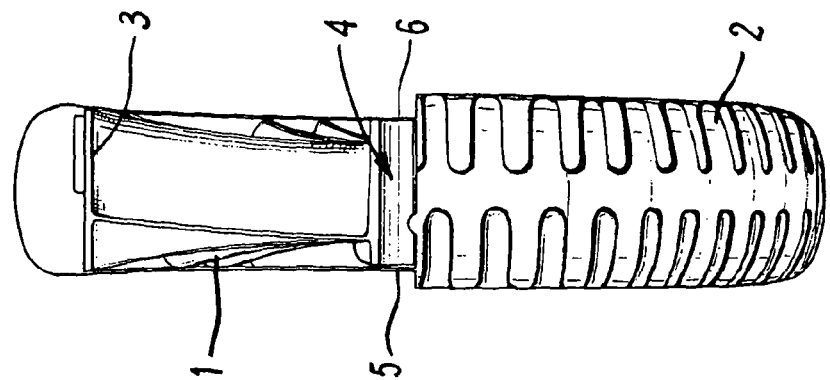
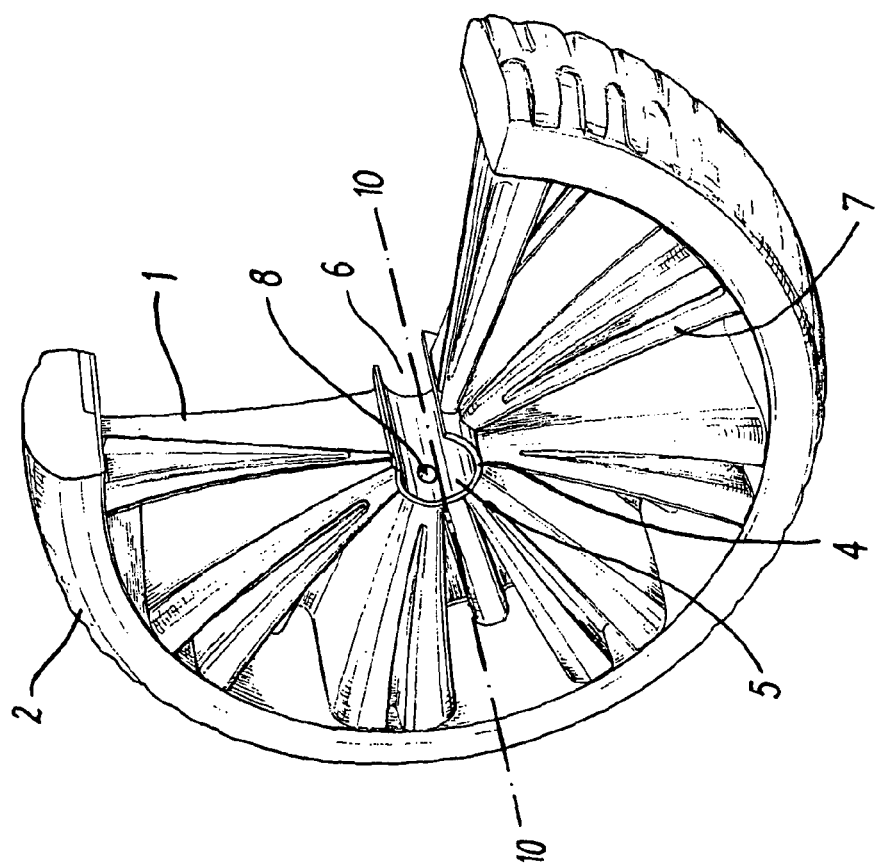

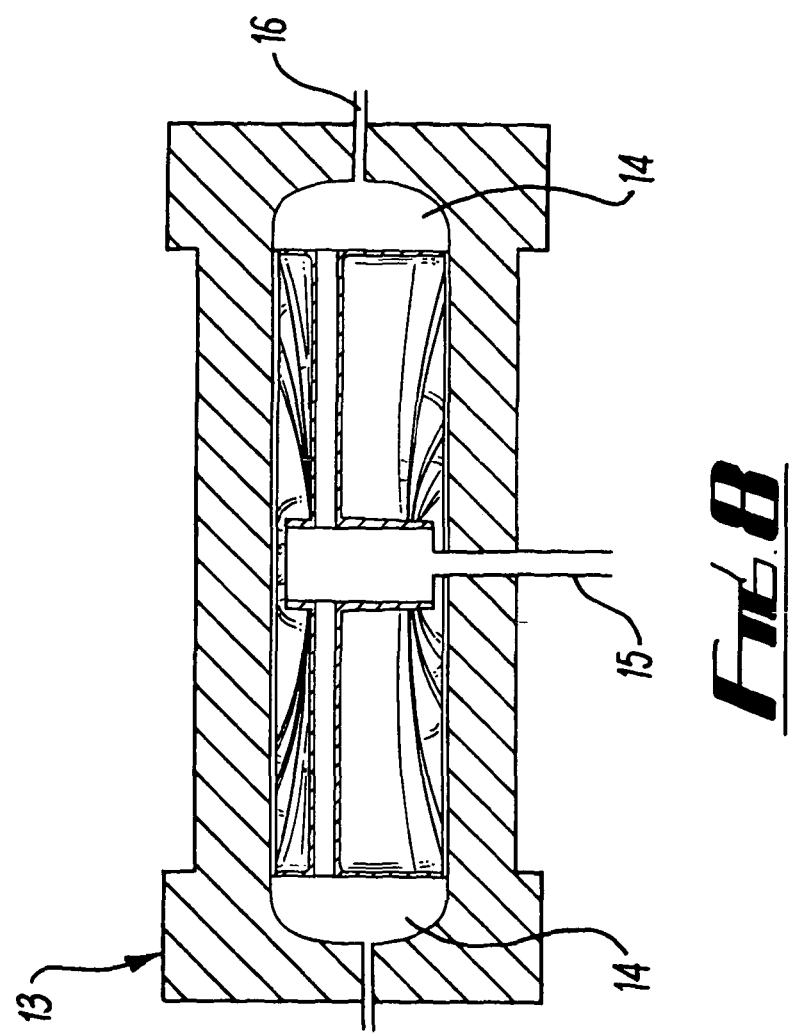

METHOD AND MANUFACTURING A WHEEL AND TYRE COMBINATION

CROSS-REFERENCE TO RELATED APPLICATIONS

The present patent document claims priority to earlier filed PCT Patent Application PCT/GB2010/050943, filed on Jun. 4, 2010, which claims priority to British National Patent Application GB0909779.1, filed on Jun. 6, 2009, the entire contents of which are incorporated herein by reference.

BACKGROUND OF THE RELATED ART

The present invention relates to a method of manufacturing a wheel with a tyre.

The present invention also relates to a wheel with a tyre.

In current wheel production, a wheel and tyre are each manufactured separately and the tyre is subsequently mounted onto the wheel. Since the wheel and tyre are manufactured separately, the costs of manufacture, storage, transport and assembly of wheels manufactured in this way are high.

With current wheels, a rim of the wheel is provided with opposed flanges, either side thereof, which protrude in a radial direction. An inner well region is defined by the flanges and the rim. The inner well region enables a tyre to be fitted to the wheel.

When solid or 'puncture proof' tyres, such as of foamed polyurethane, are used, they currently have to fit such existing wheel designs. This is disadvantageous in that the tyre must fill the inner well region. This uses an unnecessarily high amount of tyre material, which leads to inefficient and consequently expensive production.

It is known, in the manufacture of polyurethane tyres, to inject polyurethane into a mould, where it then forms into a tyre. The mould is spun, during injection of the polyurethane, in order to encourage the tyre to form correctly within the mold. However, a problem with this method is that excess foamed polyurethane material forms in the centre of the tyre as it undergoes a foaming reaction. The centrifugal force produced by spinning the mold is insufficient to prevent this. Accordingly, it is necessary to trim the excess foamed polyurethane material from the centre of the tyres.

SUMMARY OF THE INVENTION

The present invention seeks to overcome the above problems.

According to a first aspect of the invention there is provided a method of manufacturing a wheel and a tyre comprising the steps of providing a wheel and moulding a tyre to the wheel.

According to a second aspect of the invention there is provided a wheel and tyre manufactured according to the first aspect of the invention.

According to a third aspect of the invention, there is provided a wheel having an inlet and an outlet, wherein the inlet is fluidly connected to the outlet.

Since the tyre and wheel are not produced separately, a saving is made in inventory, assembly costs and transport.

Preferably the method of manufacturing comprises the step of placing a mould over the wheel, such that a cavity is formed between an inner surface of the mould and a rim of the wheel, for receiving material, typically in a liquid form, to form the tyre. The cavity preferably defines the shape of the tyre to be moulded, i.e. defines the 'negative' of the desired tyre shape. The material to form the tyre may be introduced into the mould in a liquid form and allowed to solidify in the mould to form a tyre attached to the wheel. The mould can then be removed.

When the mould is placed over the wheel, it preferably extends substantially around the circumference of the wheel and more preferably extends entirely around the circumference of the wheel.

The wheel may be provided with an inlet which is fluidly connected, preferably by a conduit, to an outlet in the rim of the wheel. The wheel preferably comprises a hub. In this case, the inlet is preferably located at the hub. Material to form the tyre may be injected into the inlet.

The wheel preferably has a substantially flat rim. In this case, the rim of the wheel preferably has no flanges. When solid or 'puncture proof' tyres are formed, this results in a saving in tyre material since the wheel has no inner well region that must be filled by the tyre.

The wheel may be provided with a plurality of such inlets and outlets. In this case, each inlet is preferably fluidly connected by a respective conduit to a respective outlet. Where there are a plurality of outlets, they are preferably distributed around the rim of the wheel.

The wheel may have at least one web, for providing strength and rigidity to the wheel, which extends radially from substantially the centre of the wheel to the rim. Where the wheel comprises a hub, the at least one web preferably extends radially from the hub to the rim. Preferably the wheel has a plurality of such webs, that each extend radially to points distributed around the rim.

The conduit is preferably housed within the at least one web. Where there is a plurality of said webs and a plurality of conduits, each conduit is preferably housed within a respective web. In this case, each conduit preferably passes from an inlet, provided in the hub, through a respective web, to an outlet provided in the rim of the wheel.

The rim of the wheel is preferably provided with a protrusion, which preferably protrudes outwardly from the rim in the radial direction. The protrusion preferably extends circumferentially around the rim. The protrusion is preferably integral with the wheel.

The protrusion may be of any suitable shape. The protrusion may have a T-shaped cross-section, having a first member which extends from the rim in the radial direction and terminating at an intersection with a second member which is integral with and perpendicular to the first member.

The wheel may be for use in any application, but is preferably for a wheel barrow. The wheel is preferably injection moulded from a polyolefin, but may be of any suitable material, including steel.

The wheel is preferably circular.

The tyre is preferably a solid tyre, i.e. a tube-less 'puncture proof' tyre. The tyre may be of any foamed material but preferably comprises foamed polyurethane.

A pipe is preferably fluidly connected to the inlet and the material to form the tyre is preferably injected into the inlet through the pipe. In this case, a nozzle of the pipe is preferably connected, by a sealed running fit, to one of said ends of the hub. A pin preferably enters the hub from the other end of the hub. This acts to close this end of the hub and leaves a small gap in the hub, into which the material to form the tyre may enter. This ensures that said material passes into the inlet.

The method of moulding may comprise heating a thermoplastic elastomer until it forms a liquid, injecting this liquid into the inlet, such that it passes into the cavity and cooling and/or curing this liquid within the cavity, where it solidifies to a desired tyre shape.

Alternatively, or additionally, the method of moulding may comprise a thermosetting reaction. In this case, at least two curable liquid components for forming the tyre are preferably injected into the inlet, such that they pass into the cavity.

The at least two curable liquid components are preferably injected into the inlet through said pipe and are preferably pre-mixed.

When the at least two curable liquid components are mixed, they preferably react with each other and then cure within the cavity to form the tyre.

Where the wheel is provided with said protrusion, the protrusion is preferably dimensioned such that when the mould is placed over the wheel, the protrusion is housed within the cavity.

The tyre is preferably moulded around the protrusion such that the protrusion acts to anchor the tyre to the wheel. Since the tyre and wheel may be of materials that do not adhere well to each other (if at all), such as polyurethane and a polyolefin respectively, and since the wheel has no inner well, the protrusion provides a means of attaching the tyre to the wheel.

Alternatively, or in addition, the contacting surface of the wheel may treated so as to increase adhesion with the tyre, such as by roughening up said surface and/or electrically and/or chemically treating said surface.

Preferably a gap is provided in the protrusion adjacent each outlet. This is so as not to impede flow of material to form the tyre through each outlet and into the cavity.

The mould and wheel are preferably rotatable. In this case, the mould and wheel are preferably spun, about a central axis of the wheel such that the material to form the tyre is encouraged to flow through the or each conduit and into the cavity. The mould and wheel may be spun in this way during injection of the material to form the tyre into the inlet. In this case, the pipe is preferably connected to the wheel at a point substantially in the centre of the wheel. This allows the wheel to be spun during the mould process, without the pipe becoming tangled, as it will not describe a circle as the wheel rotates.

As the tyre is moulded to the wheel, the solidifying tyre material seals the or each outlet closed. This has is advantageous in that it prevents the tyre forming material from backing filling through the or each conduit and into the hub during the mould process.

All of the features described herein may be combined with any of the above aspects, in any combination.

For a better understanding of the invention, and to show how embodiments of the same may be carried into effect, reference will now be made, by way of example, to the accompanying diagrammatic drawings in which:

BRIEF DESCRIPTION OF THE DRAWINGS

FIG. 1 shows an isometric view of a wheel and tyre according to the present invention, with a section of the wheel and tyre removed for illustrative purposes;

FIG. 2 shows a side view of the wheel and tyre shown in FIG. 1;

FIG. 8 shows the horizontal cross-sectional view shown in FIG. 5, with the tyre removed and with a mould placed on the wheel, for moulding a tyre to the wheel.

DETAILED DESCRIPTION OF THE PREFERRED EMBODIMENTS

Figure 3:
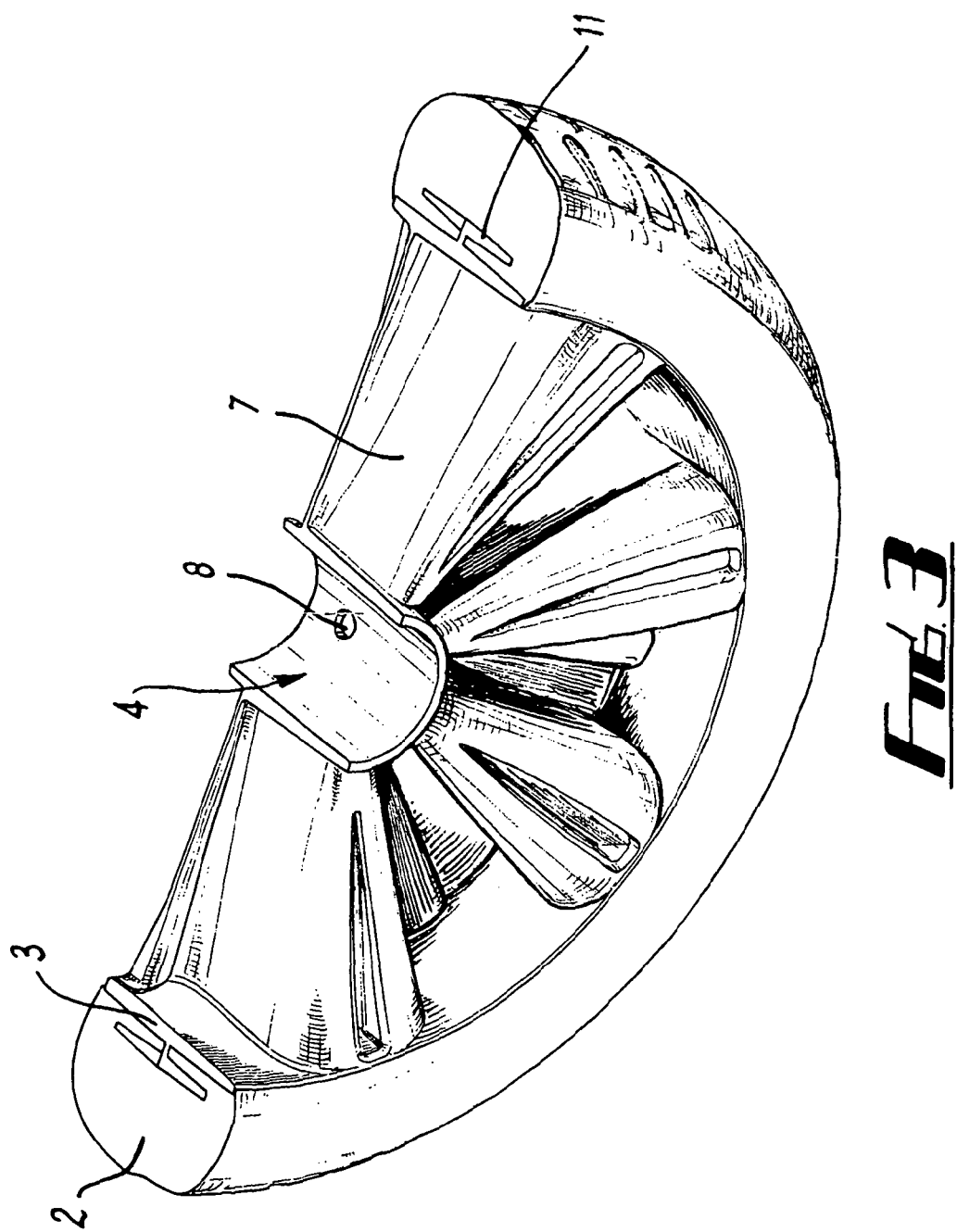
FIG. 3 shows a half section of the tyre and wheel shown in FIGS. 1 and 2.
Figure 4:
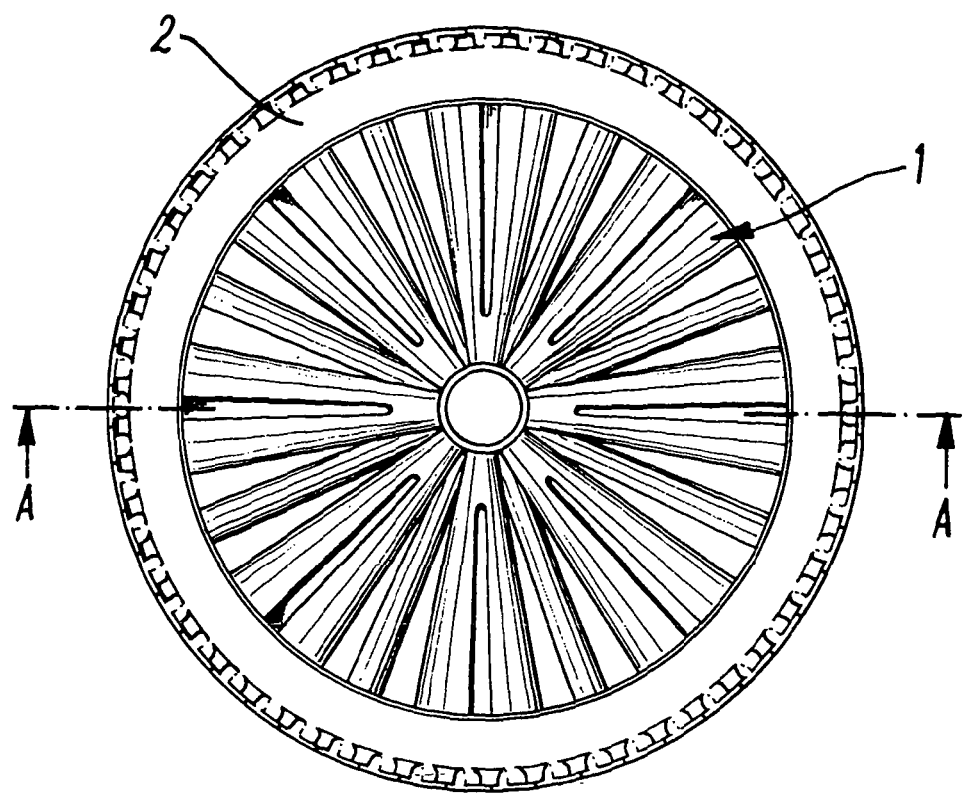
FIG. 4 shows a front elevational view of the wheel and tyre shown in FIGS. 1 and 2.
Figure 5:
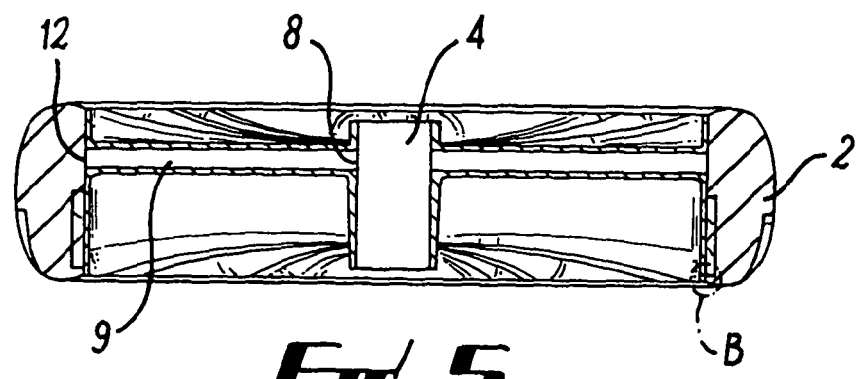
FIG. 5 shows a horizontal cross-sectional view taken along the line A-A of FIG. 4.

Referring now to the above figures, there is shown a wheel 1 and a tyre 2. The wheel and tyre are for a wheel-barrow. The wheel is injection moulded from a polyolefin, e.g. polypropylene. The wheel is circular and is provided with a rim 3 at its periphery. The rim is substantially flat.

The wheel is provided with a hub 4. A cylindrical passage is provided in the hub that extends through the centre of the wheel, in a direction perpendicular to the diameter of the wheel, terminating at apertures provided on opposed faces of the wheel, forming first and second ends 5, 6 of the hub.

The wheel has a plurality of webs 7 that each extend radially from the hub to points distributed around the periphery of the wheel. The webs provide strength and rigidity to the wheel.

A pair of inlets 8 is provided in an inner wall of the hub. A pair of outlets 12 is provided in the rim of the wheel, distributed circumferentially around the rim. Each inlet is fluidly connected by a respective conduit 9 to a respective outlet 12.

Each of the conduits is housed within a respective web, such that each conduit passes from an inlet, provided in the hub, through a respective web, to an outlet provided in the rim of the wheel.

The tyre is a solid tyre, i.e. a tube-less 'puncture proof' tyre made of foamed polyurethane.

Referring now to FIG. 8, in order to form the tyre, a mould 13 is placed over the wheel. The mould extends around the rim of the wheel. A cavity 14 is formed between an inner surface of the mould and the wheel. The cavity defines the shape of the tyre to be moulded, i.e. defines the 'negative' of the desired tyre shape.

A pipe 15 is connected to one end 5 of the hub. A nozzle of the pipe is connected by a sealed running fit to one end 5 of the hub. Two liquid chemicals, suitable for forming polyurethane, are injected through the pipe and into said end 5 of the hub. A pin (not shown) is provided in the other end 6 of the hub. This closes the end 6 of the hub and leaves a small gap in the hub, into which the liquid chemicals may enter. The liquid chemicals pass from the pipe, through the hub and into each of the inlets.

The pipe is connected to the hub at the centre of the wheel. This allows the wheel to be rotated during the mould process (see below), without the pipe becoming tangled, as it will not describe a circle as the wheel rotates.

The liquid chemicals are mixed together in the pipe. The liquid chemicals react together and are then cured in the cavity to form a polyurethane tyre.

Air outlets 16 are provided in the cavity, to allow air to escape from the cavity, as it is filled with the liquid chemicals.

The mould and wheel are rotatable. As the liquid chemicals are injected into the wheel, the mould and wheel are spun, about a central axis 10 of the wheel. This acts to encourage the liquid chemicals to flow through the conduits and into the mould cavity.

As the tyre is moulded to the wheel, the solidifying polyurethane seals the or each outlet closed. This has is advantageous in that it prevents the polyurethane from backing filling through conduits and into the hub during the mould process.

The rim of the wheel is provided with an integral protrusion 11. The protrusion has a T-shaped cross section and extends circumferentially around the rim. In FIG. 3, the protrusion is shown partially cut away for illustrative purposes.

The tyre is moulded around the protrusion such that the protrusion acts to anchor the tyre to the wheel. Since the tyre and wheel are of polyurethane and a polyolefin respectively, which do not adhere well to each other, and since the wheel has no inner well, the protrusion provides a means of attaching the tyre to the wheel.

In addition, the contacting surface of the wheel is treated so as to increase adhesion with the tyre, such as by roughening up said surface and/or electrically and/or chemically treating said surface.

Gaps are provided in the protrusion at points on the circumference of the wheel where the conduits exit through the rim of the wheel, into the mould cavity. This is so as not to impede flow through the conduits and into the cavity.

Figure 6:
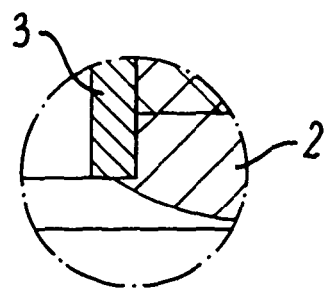
FIG. 6 shows an enlarged view of the region labelled B in FIG. 5.
Figure 7:
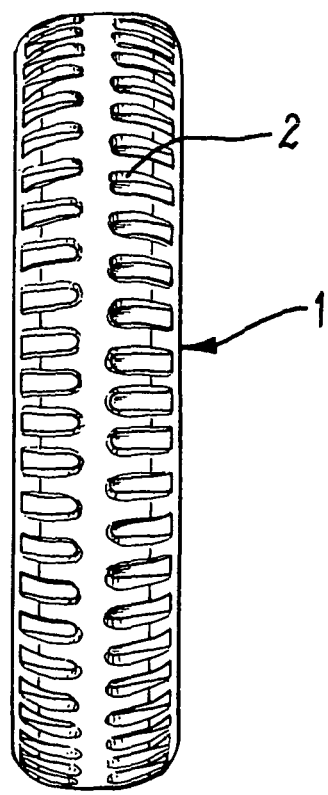
FIG. 7 shows a side elevational view of the wheel and tyre shown in FIG. 4.

As shown in FIGS. 3 and 6, the tyre overlaps onto the front face of the rim. This ensures that the rim is covered by the tyre.

Since the wheel has no inner well region that must be filled by the tyre, less tyre material, i.e. polyurethane, is needed to form the tyre. In addition, since the tyre and wheel are not produced separately, a saving is made in inventory, assembly costs and transport. The protrusion provides a means of anchoring the tyre to a substantially flat rim of a wheel.

The above embodiment is described by way of example. Many variations are possible without departing from the invention.

The invention claimed is:

1. A method of manufacturing a wheel and a tyre combination comprising the steps of:
   providing a wheel having a rim;
   placing a mould over the wheel, such that a cavity is formed between an inner surface of the mould and the rim of the wheel, said cavity receiving material to form the tyre;
   wherein the wheel is provided with an inlet which is fluidly connected by a conduit to an outlet in the rim of the wheel; and
   moulding a tyre to the wheel, wherein material to form the tyre is injected into the inlet.

2. A method of manufacturing a wheel according to claim 1 wherein the material to form the tyre is introduced into the mould in a liquid form and allowed to solidify in the mould to form a tyre attached to the wheel.

3. A method of manufacturing a wheel according to claim 1 wherein the wheel comprises a hub and the inlet is located at the hub.

4. A method of manufacturing a wheel according to claim 1 wherein the inlet is provided at a point substantially in the centre of the wheel.

5. A method of manufacturing a wheel according to claim 1 wherein the wheel is provided with a plurality of said inlets and outlets.

6. A method of manufacturing a wheel according to claim 5 wherein the outlets are distributed around the rim of the wheel.

7. A method of manufacturing a wheel according to claim 5 wherein each inlet is fluidly connected by a respective conduit to a respective outlet.

8. A method of manufacturing a wheel according to claim 1 wherein a pipe is fluidly connected to the inlet and the material to form the tyre is injected into the inlet through the pipe.

9. A method of manufacturing a wheel according to claim 8 wherein a nozzle of the pipe is connected, by a sealed running fit, to one of said ends of the hub.

10. A method of manufacturing a wheel according to claim 1 wherein the material to form the tyre is introduced into the mould in a liquid form and allowed to solidify in the mould to form a tyre attached to the wheel.

11. A method of manufacturing a wheel according to claim 10 wherein the wheel comprises a hub and the inlet is located at the hub.

12. A method of manufacturing a wheel according to claim 11 wherein the inlet is provided at a point substantially in the centre of the wheel.

* * * * *